Figure 1:
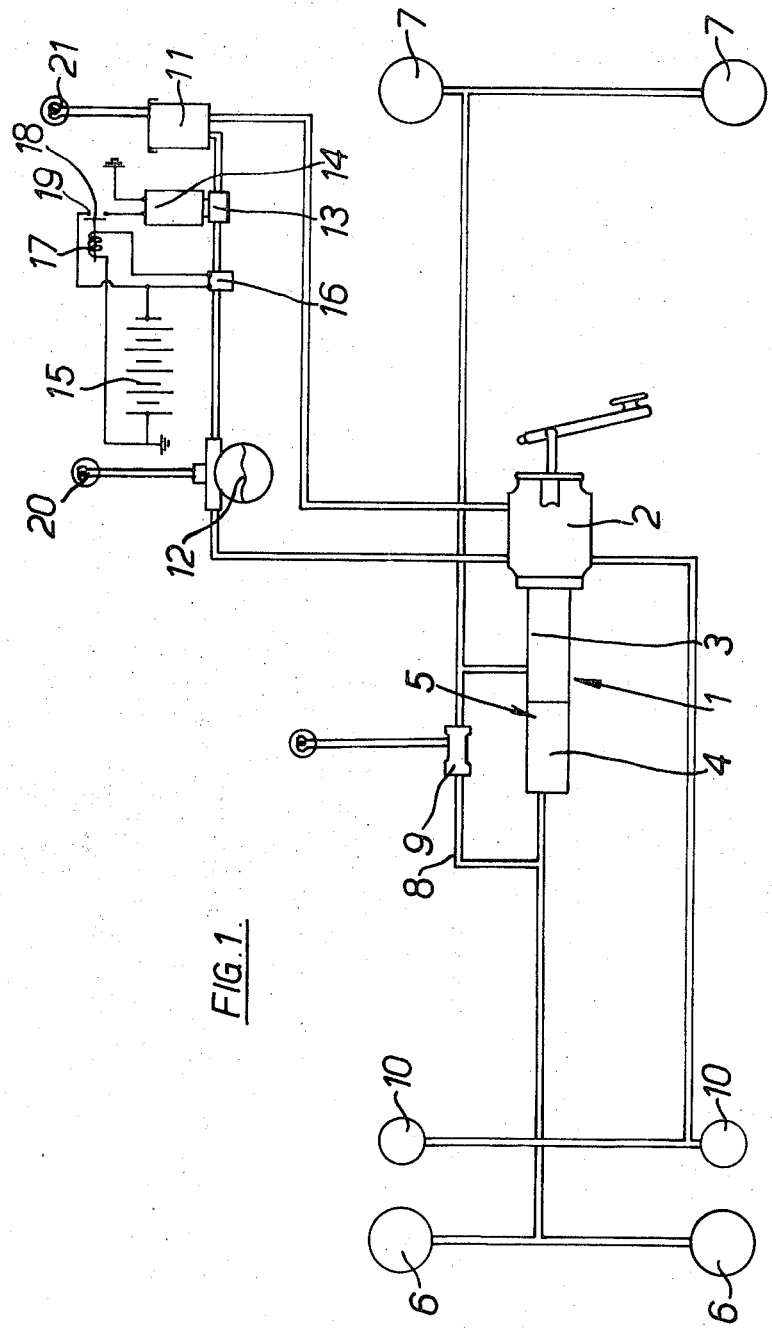

United States Patent [19]
Cochrane et al.

[11] 3,799,300
[45] Mar. 26, 1974

[54] HYDRAULIC BRAKING SYSTEMS FOR VEHICLES

[75] Inventors: Robin Adam Cochrane, Haseley Knob; Brian Ingram, Balsall Common; Douglas Roy Spence, Olton, all of England

[73] Assignee: Girling Limited, Birmingham, England

[22] Filed: Feb. 9, 1972

[21] Appl. No.: 224,768

[30] Foreign Application Priority Data
Feb. 22, 1971   Great Britain...................... 5115/71
July 3, 1971    Great Britain.................... 31,263/71

[52] U.S. Cl....................... 192/3 R, 60/418, 60/547
[51] Int. Cl........................... F15d 67/00, F15b 1/02
[58] Field of Search............ 60/54.5, 54.6 P, 54.6 E, 60/413, 415, 418; 188/345; 192/3 R

[56] References Cited
UNITED STATES PATENTS
| | | | |
|---|---|---|---|
| 2,940,561 | 6/1960 | Atkin | 192/3 R |
| 3,575,001 | 4/1971 | Wilson | 60/54.6 E |
| 3,640,067 | 2/1972 | Ingram | 60/54.6 E |
| 3,574,999 | 4/1971 | Nectoux | 60/418 |
| 3,712,057 | 1/1973 | Aiki | 60/54.5 P |
| 3,283,505 | 11/1966 | Julow et al. | 60/54.5 P |
| 3,706,479 | 12/1972 | Klein | 188/345 |

FOREIGN PATENTS OR APPLICATIONS
1,151,773   5/1969   Great Britain........................ 60/418

*Primary Examiner*—Martin P. Schwadron
*Assistant Examiner*—A. M. Zupcic
*Attorney, Agent, or Firm*—Imirie and Smiley

[57] ABSTRACT

In an hydraulic braking system for vehicles the master cylinder of a booster-operated master cylinder assembly is adapted to supply fluid under pressure to a first hydraulic actuator of a wheel brake, and a source of hydraulic fluid under pressure is connected to a second hydraulic actuator of the same or a different wheel brake through a normally closed connection in the assembly which is opened upon operation of the booster whereby fluid under pressure from the source of hydraulic fluid is supplied to the second hydraulic actuator.

2 Claims, 4 Drawing Figures

HYDRAULIC BRAKING SYSTEMS FOR VEHICLES

This invention relates to hydraulic braking systems for vehicles of the kind in which the master cylinder of a booster-operated master cylinder assembly is adapted to supply fluid under pressure to a first hydraulic actuator of a wheel brake.

According to our invention in an hydraulic braking system of the kind set forth a source of hydraulic fluid under pressure is connected to a second hydraulic actuator of the same or a different wheel brake through a normally closed connection in the assembly which is opened upon operation of the booster whereby fluid under pressure from the source of hydraulic fluid is supplied to the second hydraulic actuator.

Conveniently the booster of the booster-operated master cylinder assembly comprises a positively actuated piston working in a cylinder bore in a housing connected to the source of hydraulic fluid under pressure through a first normally closed valve defining the normally closed connection, and to a reservoir for the high pressure source through a second normally open valve. When the piston is advanced in the bore the second valve closes and the first valve is opened so that high pressure fluid admitted to the bore actuates the master cylinder and is supplied simultaneously to the second hydraulic actuator through a port in the wall of the housing.

The source of high pressure fluid may comprise a high pressure pump. Preferably the source comprises an hydraulic accumulator supplied with fluid under pressure from a high pressure pump. In either case the high pressure pump may be driven by an electric motor. In such a construction, when the source of high pressure fluid comprises an hydraulic accumulator, the pump is operated in accordance with the pressure in the accumulator. This can be achieved by the provision of a pressure sensitive switch responsive to the pressure in the accumulator which is adapted to activate the electric motor when the pressure in the accumulator is below a predetermined value.

Preferably the electric motor is energised from the electrical storage battery of the ignition circuit of the vehicle, and, when the pressure in the accumulator is below the predetermined value the ignition circuit is closed, the pressure switch is operative to close the contacts of a contact breaker and make an electrical circuit to energise the electric motor.

The ignition circuit and the circuit for energising the pump may be arranged in such a manner that a motor for starting the prime mover of the vehicle can not be energised when the pressure in the accumulator is below the predetermined value. This ensures that the prime mover of the vehicle can not be started unless sufficient hydraulic fluid pressure is available for operating the booster and actuating the second hydraulic actuator, and also the tandem master cylinder feeding the remainder of the hydraulic brake actuators.

When the source of high pressure fluid comprises an hydraulic accumulator, the hydraulic accumulator may be supplied with fluid under pressure from a mechanically driven high pressure pump.

Conveniently the pump may be driven from the prime mover of a vehicle, for example, from the crank shaft or cam shaft. Alternatively the pump may be driven from a cardan shaft.

In either case the hydraulic accumulator is provided with an unloader valve which is adapted to open when the pressure within the accumulator exceeds a predetermined value so that the excess pressure fluid is returned directly to the reservoir through a return line which by-passes the pump.

Figure 2:
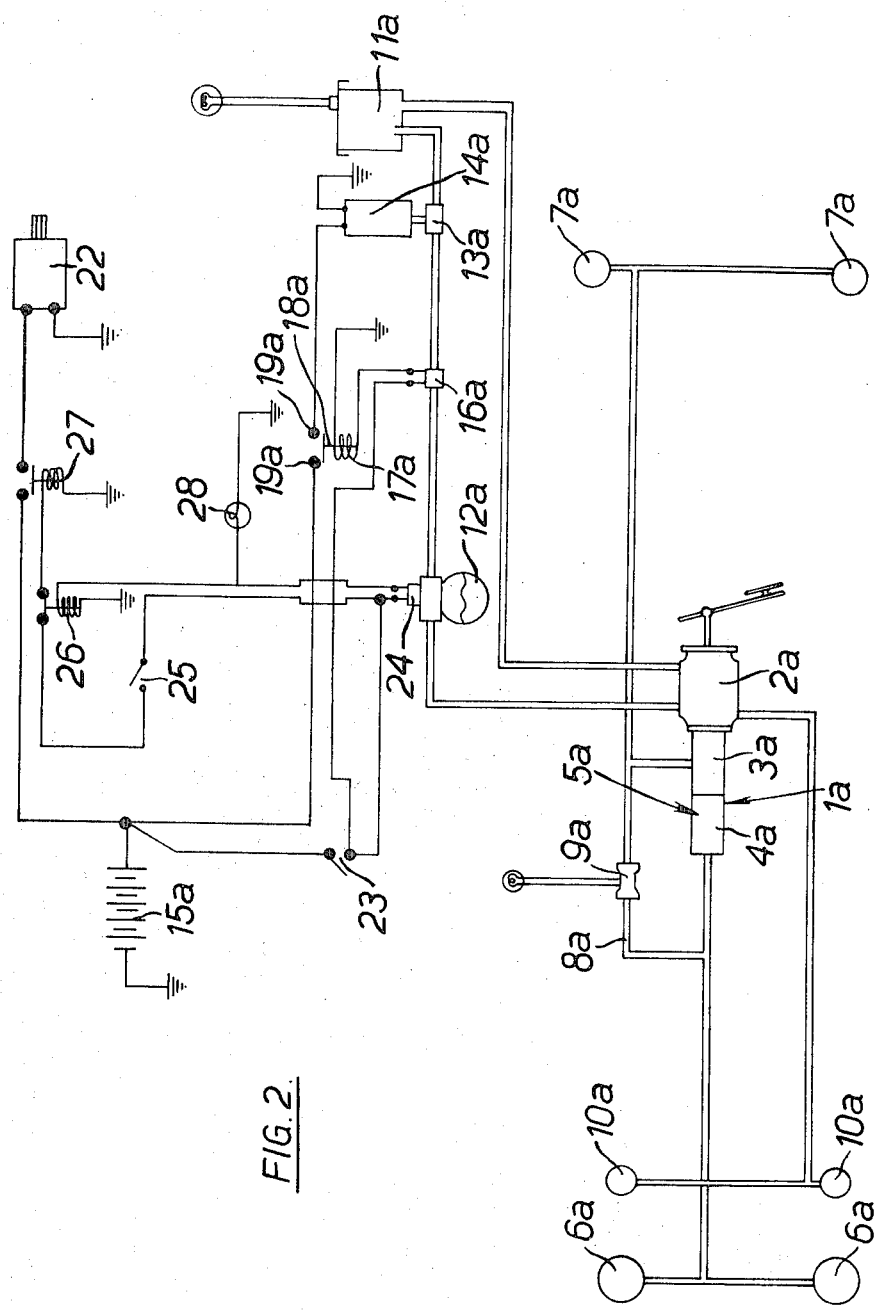
Figure 3:
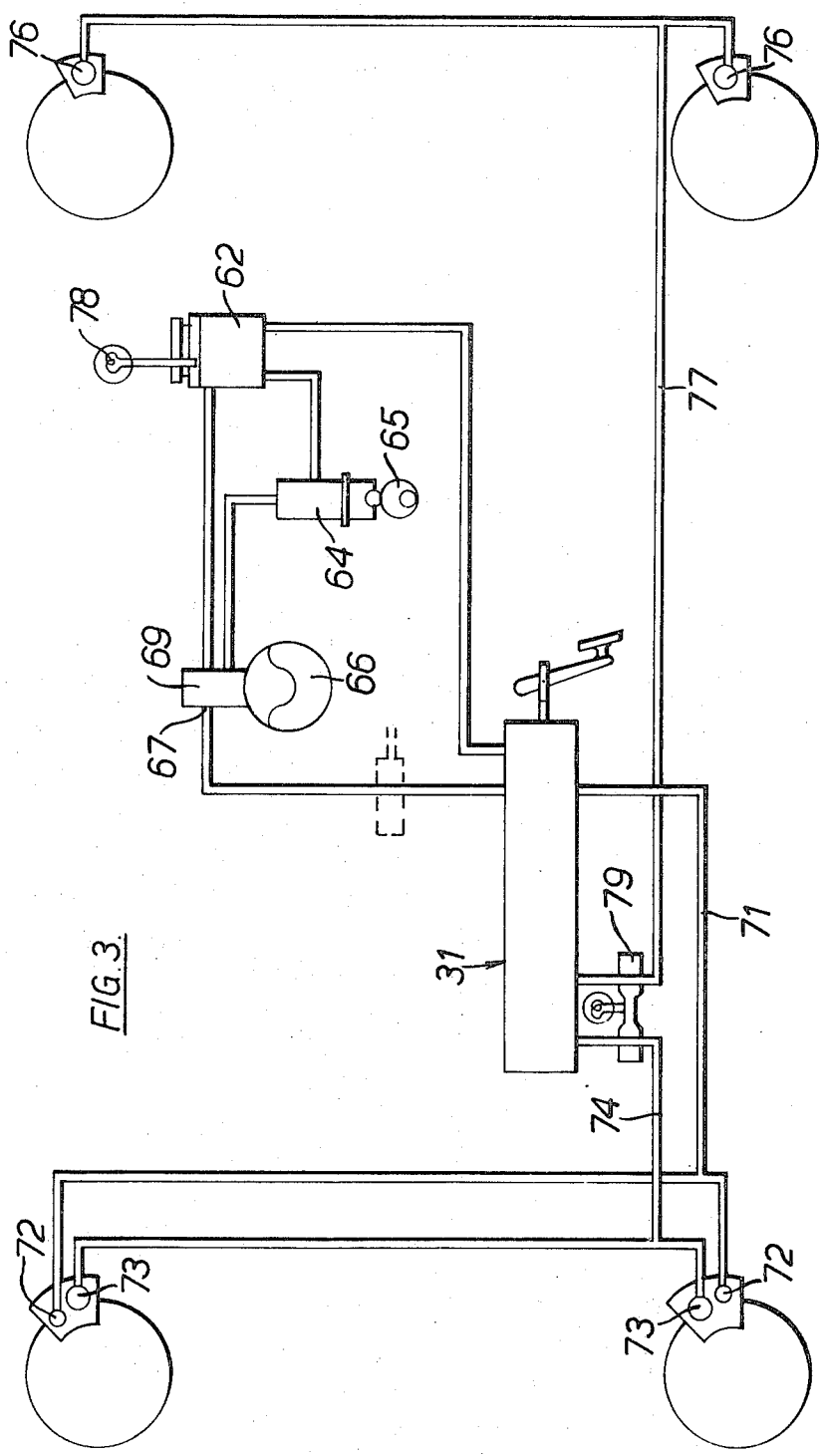
Figure 4:
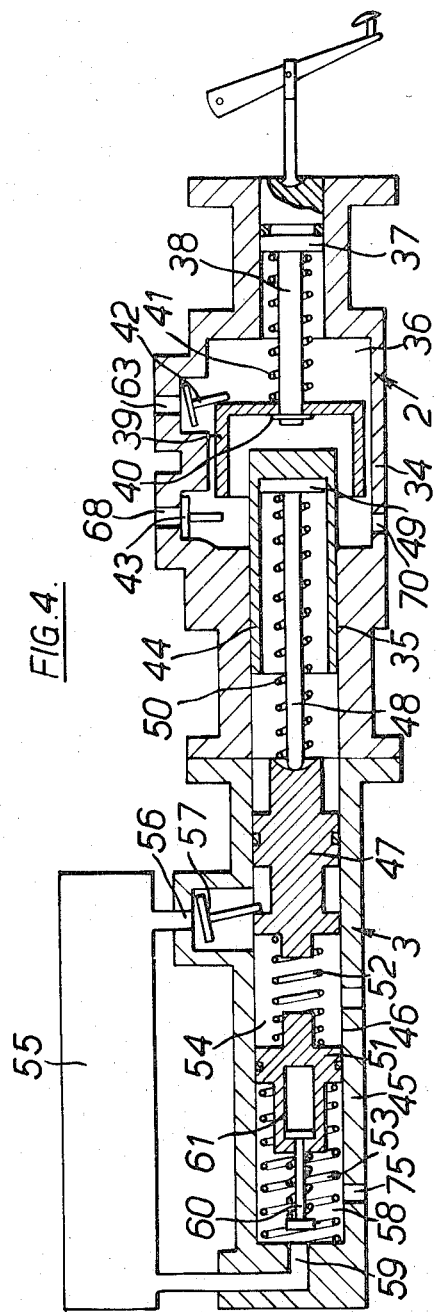

Some hydraulic braking systems for vehicles in accordance with our invention are illustrated in the accompanying drawings in which:

FIG. 1 is a layout of one braking system;
FIG. 2 is a layout of a further braking system;
FIG. 3 is a layout of yet a further braking system; and
FIG. 4 is a longitudinal section on an enlarged scale of the booster-operated master cylinder assembly incorporated in the braking system of FIG. 3.

In the braking system illustrated in the layout of FIG. 1, 1 is a combined hydraulic booster and tandem master cylinder assembly comprising a pedal-operated hydraulic booster 2 for pressurising hydraulic fluid in first and second independent pressure spaces 3 and 4 of the master cylinder 5. The pressure space 4 is connected to a pair of hydraulic actuators 6 for actuating the brakes on the front wheels of the vehicle and the pressure space 3 is connected to a pair of hydraulic actuators 7 for actuating the brakes on the rear wheels of the vehicle. In an "off" position of brake the pressure spaces 3 and 4 are in communication with the same or a different hydrostatic reservoir for fluid through normally open valves which close when the master cylinder is operated so that fluid under pressure is delivered to the hydraulic actuators 6 and 7 simultaneously.

The separate supply lines to the hydraulic actuators 6 and 7 are interconnected by a line 8 in which is located a pressure differential warning actuator 9 for detecting a differential between the pressures applied to the pairs of hydraulic actuators 6 and 7. The pressure differential warning actuator 9 forms the subject of our U.S. Pat. application No. 33171/69 and need not be described further herein.

The booster 2 is connected through an outlet port to a second pair of hydraulic actuators 10 for actuating the brakes on the front wheels of the vehicle. The brakes which are actuated by the hydraulic actuators 10 may be the same as those actuated by the actuators 6, or they may comprise different brakes on the same wheel. Alternatively, or in addition, the same or different brakes on the rear wheels of the vehicle may be actuated by additional hydraulic actuators connected to the hydraulic booster 2.

The hydraulic booster 2 is connected through a first normally open valve to a reservoir 11 for hydraulic fluid, and through a second normally closed valve to an hydraulic accumulator 12. The hydraulic accumulator 12 is supplied with fluid under pressure from a pump 13 driven by an electric motor 14 adapted, upon closure of a switch (not shown), to be energised by an electrical storage battery 15.

A pressure responsive switch 16 located in a pipe-line through which fluid is supplied from the pump 13 to the accumulaotr is connected in parallel with the battery 15 and is adapted to control the energisation of a relay 17 having a movable contact 18 for engagement with a pair of fixed contacts 19 between the motor 14 and the battery 15.

When the pressure in the hydraulic accumulator 12 is below a predetermined value and the switch is closed, the pressure responsive switch 16 is operative to cause the movable contact 18 to engage with the fixed contacts 19 and make a circuit to energise the motor 14 and operate the pump 13. This continues until the pressure in the accumulator attains the said predetermined value whereupon the pressure responsive switch 16 is operative to withdraw the movable contact 18 and brake the pump energising circuit.

Operation of the piston of the booster and tandem master cylinder assembly 1 by the pedal causes the first valve to close and cut off communication with the reservoir. Thereafter the second valve is opened so that fluid under pressure from the accumulator 12 enters the booster and actuates the master cylinder 1, at the same time being supplied to the hydraulic actuators 10 through the outlet port.

When the pressure in the accumulator 12 drops below the said predetermined value the pressure responsive switch is again operative to energise the motor 14 and operate the pump 13 as described above.

The accumulator 12 is provided with a low pressure warning light 20, and the reservoir 11 is provided with a low level warning light 21.

The braking system shown in the layout of FIG. 2 is a modification of the embodiment shown in FIG. 1 and corresponding reference numerals qualified by the suffix *a* have been applied to corresponding parts.

As illustrated in FIG. 2 the motor 14a is connected in parallel with a starter motor 22 for the prime mover of the vehicle and the battery 15a.

An ignition switch 23 is connected between the battery 15a and a circuit providing a communication between the pressure switch 16a and the terminals of a low pressure warning switch 24 of the accumulator 12a. The terminals of the low pressure warning switch 24 are connected to a starter switch 25 and a relay 26. A further relay 27, controlling operation and the starter motor 22, is connected in parallel with the low pressure warning switch 24, and a low pressure warning light 28 is connected to the terminals of the low pressure switch 24.

To start up the prime mover of the vehicle the ignition switch 23 is closed. When the pressure of fluid in the hydraulic accumulator 12a is at least equal to the predetermined value the contacts controlled by the relay 26 are closed. Thus closure of the starter switch 25 effects energisation of the relay 27 to operate the starter motor.

When the brakes are applied by operation of the booster and master cylinder assembly 1a, with the pressure of the hydraulic accumulator 12a at a value at least equal to the said predetermined value, the hydraulic actuators 6a, 7a and 10a are supplied with fluid under pressure as described above with reference to the embodiment of FIG. 1. Finally, under such conditions, should the pressure of the accumulator drop below the said predetermined value, the relay 17a controlled by the pressure switch 16a is operative to urge the movable contact 18a into engagement with the contacts 19a and energise the motor 14a to drive the pump 13a.

If the pressure of the hydraulic accumulator is below the said predetermined value when the starter switch 25 is closed, the low pressure warning switch is operative to open the contacts of the relay 26 and isolate the starter relay 27. Thereafter the movable contact 18a of the relay 17a engages with the fixed contacts 19a so that the pump 13a is operated to charge the accumulator until it attains a predetermined pressure. When the accumulator 12a attains a predetermined value of pressure the contacts of the relay 26 close automatically so that the starter motor 22 can be operated to start the prime mover upon closure of the starter switch 25.

In the braking system illustrated in FIGS. 3 and 4 of the accompanying drawings 31 is a combined hydraulic booster and tandem master cylinder assembly comprising a pedal-operated hydraulic booster 32 for operating a master cylinder 33.

The booster 32 comprises a body 34 provided with a longitudinal through bore 35 of which a portion at an intermediate point in its length is enlarged to define a chamber 36. A pedal operated piston 37 working in a portion of the bore 35 at the outer end of the body 34 carries an extension 38 of reduced diameter which projects into the chamber 36 and on which is slidably mounted a flanged sleeve 39 in the form of a cup-shaped member. Normally the sleeve 39 is urged against a stop 40 at the free end of the extension 38 by a compression spring 41 acting between the flange of the sleeve 39 and the piston 37. The sleeve 39 is positioned between the stems of a pair of spring loaded tilting valves 42 and 43 which extend into the chamber 36 into the path of the sleeve 39.

A second or floating cup-shaped piston 44 works in the portion of the longitudinal bore 35 at the inner end of the chamber 36 and normally the outer closed end of the piston 44 projects rearwardly into the chamber 36.

The master cylinder 33 comprises a body 45, which, at its inner end, is clamped against the adjacent inner end of the body 34 of the booster. The body 45 is provided with a longitudinal bore 46 which is aligned with and of the same diameter as the bore 35. A main or third piston 47 working in the bore 46 is engaged at its outer end by a rod 48 which acts between that piston and the inner face at the closed end of the cup-shaped piston 44. The rod 48 carries at its outermost end an enlarged head 49 working within the piston 44, and a compression return spring 50 surrounding the rod 48 acts between the piston 47 and the head 49 to urge the piston 44 into a forward retracted position.

A floating or fourth piston 51 works in the bore 46 between the inner end of the piston 47 and the closed end of the bore 46, and return springs 52 and 53, acting respectively between the pistons 47 and 51 and between the piston 51 and the closed end of the bore 46, urge the pistons 51 and 47 rearwardly into the retracted position shown in the drawings.

A primary pressure space 53 defined in the bore 46 between adjacent ends of the piston 47 and 51 normally communicates with a reservoir 55 for fluid through a port 56 controlled by a spring loaded tilting valve 57 which is normally held in an open position by an engagement between its stem and the piston 47.

A secondary pressure space 58 defined in the bore 46 between the outer end of the piston 51 and the closed end of the bore normally communicates with the reservoir 55 through an axial port 59. The port 59 is controlled by spring loaded axially movable valve member 60 which is slidably mounted in a bore 61 in the piston 51 and which is normally spaced from the port 59.

A reservoir 52 for fluid communicates with a port 63 in the wall of the body 34 which is controlled by the tilting valve 42. The reservoir 62 supplies fluid to a mechanically operated pump 64 which is driven from the prime mover of the vehicle or the cardan shaft through a cam box 65. The pump 64 delivers hydraulic fluid under pressure to an hydraulic accumulator 66 of which an outlet 67 is connected to a further port 68 in the wall of the body 34 which is controlled by the tilting valve 43.

The hydraulic accumulator 66 incorporates an unloader valve 69 which is adapted to maintain the pressure of hydraulic fluid in the accumulator at a predetermined value. When that value is exceeded the unloader valve 69 opens automatically and fluid from the accumulator 66 is returned to the reservoir 62.

An outlet port 70 in the wall of the body 34 in communication with the chamber 36 is connected through a pipe-line 71 to hydraulic actuators 72 for actuating the brakes on a front pair of wheels of the vehicle. The pressure space 58 is connected to a different pair of actuators 73 of the same front wheel brakes through a pipe-line 74 and a port 75, and the actuators 73 are of greater diameters than the actuators 72. The pressure space 54 is connected to actuators 76 for actuating the brakes on a rear pair of wheels through a pipe-line 77.

In the normal inoperative position shown in the drawings the sleeve 39 holds the tilting valve 42 in a tilted open position so that communication is established between the reservoir 62 and the chamber 36. In that position the forward end of the sleeve 39 is spaced from the tilting valve 43 so that the valve is closed due to its spring loading thereby cutting off communication between the hydraulic accumulator 66 and the chamber 36. Similarly the valves 57 and 60 are open so that the pressure spaces 54 and 58 are in communication with the reservoir 55.

When the pedal is operated, the piston 37 is advanced in the bore 35 advancing the sleeve 39 with it. Initial movement of the sleeve 39 in that direction permits the tilting valve 42 to close thereby cutting off communication between the reservoir 62 and the chamber 36. Upon further movement of the sleeve 39 in the same direction, the inner end of the sleeve 39 opens the tilting valve 43 so that fluid under pressure from the hydraulic accumulator 66 enters the chamber 36 and is supplied to the hydraulic actuators 72 of the front wheel brakes through the pipe-line 71. Simultaneously, the pressure in the chamber 36 acts on the closed end of the piston 44 to advance that piston in the bore 35, and the piston 47 is also advanced in the bore 46 due to the action of the push-rod 48 which permits the tilting valve 57 to close and isolate the reservoir 55 from the pressure chamber 54. That movement of the piston 47 is transmitted to the piston 51 through the spring 52 which causes the valve member 60 to engage with a seating around the port 59 and isolate the reservoir 55 from the pressure space 58. Further movement of the piston 47 and 51 in the same direction pressurises the fluid in the pressure spaces 54 and 58 and that pressure fluid is supplied to the actuators 73 and 76 through the pipe-lines 74 and 77 respectively. Thus all the actuators 72, 73 and 76 are actuated simultaneously.

The high pressure fluid in the chamber 36 also acts on the inner end of the piston 37 to apply to the pedal a reaction opposing the brake applying force. That pressure also acts on the flange of the sleeve 39 in a direction to move the sleeve rearwardly with respect to the extension 38 and into a balanced or neutral position in which both valves 42 and 43 are closed. Thus, only a predetermined pressure can be applied to the actuators 72 through a pipe-line 71.

It is arranged that the pressure applied to the actuators 72 from the chamber 36 is equal to the pressure supplied to each of the other pairs of actuators 73 and 76 from each pressure space 58, 54. Since the actuators 73 are of greater diameters than the actuators 72, when the system is operating normally, greater efforts are applied to the front wheel brakes by the actuators 73 than by the actuators 72.

In the event of failure of the hydraulic circuit between the pump 64 and the actuators 72, for example upon failure of the chamber 36, the brakes on the front and rear wheels can still be applied by actuators 73 and 76. In such circumstances the inner end of the push-rod 48 engages directly with the adjacent end of the piston 44 and thereafter the pressure spaces 54 and 58 are pressurised as described above.

Should the pressure space 58 fail, the piston 51 is advanced in the bore through a greater distance before fluid in the operative pressure space can be pressurised. Therefore a delay occurs before the sleeve 39 attains the balanced condition described above in which both valves 42 and 43 are closed. Thus an increased or higher fluid pressure is applied to the actuators 72 from the chamber 36 to increase the effort applied to the front wheel brakes and compensate for lack of operation of either the actuators 73 or the actuators 76.

Should two of the pressure spaces 54 and 58 and the chamber 36 fail, either the front or rear wheel brakes can still be applied from the remaining operative pair of actuators.

The reservoir 36 is provided with a contents indicator in the form of an electric lamp 78 which is mounted in a convenient location in the vehicle within the view of the driver, preferably upon the dashboard. The lamp 78 is energised when the level of fluid within the reservoir 62 drops below a predetermined minimum value.

The pipe-lines 74 and 77 are connected to opposite ends of a pressure differential warning actuator 79 which indicates failure of one of the pressure spaces 54 and 58. The pressure differential warning actuator is identical with that incorporated in the braking system described above with reference to FIG. 1.

We claim:

1. An hydraulic braking system for a vehicle having a prime mover, a starter motor for said prime mover, and an electrical storage battery for energising said starter motor, said braking system brake, a wheel brak, a first hydraulic actuator for actuating said wheel brake, a booster-operated master cylinder assembly incorporating an hydraulic master cylinder for supplying fluid under pressure to said first hydraulic actuator, and a booster for actuating said master cylinder, a second hydraulic actuator for actuating a wheel brake, a source of fluid under pressure, and a normally closed connection in said booster-operated master cylinder assembly between said source of fluid under pressure and said second hydraulic actuator, the arrangement being such that upon operation of said booster-operated master cylinder assembly said normally closed connection is open and fluid is supplied to said second hydraulic actuator from said source of fluid under pressure, wherein said source of fluid under pressure comprises an hydraulic accumulator, and there is incorporated a high pressure pump for supplying fluid under pressure to said accumulator, an electric motor for driving said pump adapted to be energised by said electrical storage battery, and pressure responsive means for controlling energisation of said electric motor and for preventing operation of said starter motor when the pressure in said accumulator is below a predetermined value.

2. An hydraulic braking system as claimed in claim 1, wherein said pressure responsive means comprises a first pressure sensitive switch responsive to pressure in said accumulator and connected in an electrical circuit for said electric motor, and a second pressure sensitive switch responsive to said pressure in said accumulator and connected in an electrical circuit for said starter motor.

* * * * *